June 23, 1925. Re. 16,100
J. D. TOMPKINS
PAPER MAKING MACHINE
Original Filed April 6, 1921
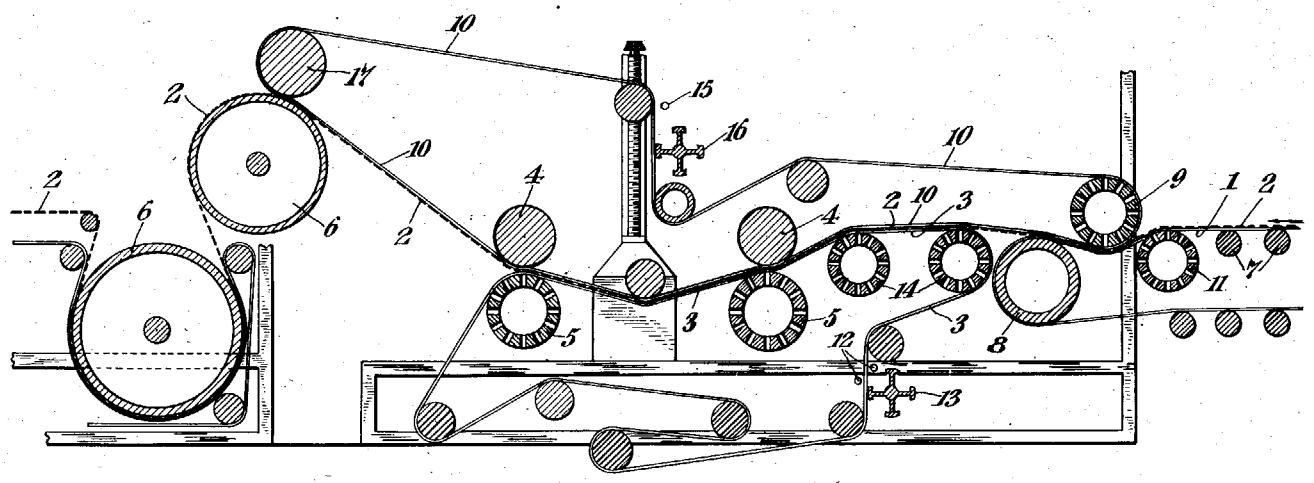
Inventor
John D. Tompkins
By his Attorneys
Prindle, Wright, Neal & Bean Reissued June 23, 1925. Re. 16,100

UNITED STATES PATENT OFFICE.

JOHN D. TOMPKINS, OF VALATIE, NEW YORK.

PAPER-MAKING MACHINE.

Original No. 1,454,606, dated May 8, 1923, Serial No. 459,032, filed April 6, 1921. Application for reissue filed February 21, 1925. Serial No. 10,967.

*To all whom it may concern:*

Be it known that I, JOHN D. TOMPKINS, a citizen of the United States, residing at Valatie, in the county of Columbia and State of New York, have invented a certain new and useful Paper-Making Machine, of which the following is a specification.

The invention has for an object to provide a paper making machine wherein the paper may be run at a relatively high speed, particularly by removing water from the paper web and the felt aprons associated therewith in such manner as to insure the avoidance of an excess of water which would injure the paper web in passing through the machine at high velocity.

Other objects of the invention (when applied to machines of the Fourdrinier type) are to provide a machine of such character that the paper web will not be injured in the operation of transferring the same from the Fourdrinier forming wire to the parts of the machine which perform the subsequent operations thereupon, and to avoid injury of the forming wire during the operation above mentioned.

Further objects and advantages of the invention will be in part obvious and in part specifically pointed out in the description hereinafter contained which, taken in connection with the accompanying drawings discloses a preferred embodiment of the invention; such embodiment, however, is to be considered as merely illustrative of its principle.

In the drawings:

The single figure is a somewhat diagrammatic vertical longitudinal section of certain parts of a paper machine made in accordance with the invention.

Referring to the drawings I have disclosed a paper making machine having a Fourdrinier forming wire 1 adapted to carry a mat of paper fibres in the usual manner, from which the paper web 2 is transferred to move between a lower felt apron 3 and an upper felt apron 10, passing between one or more sets of upper and lower press rolls 4 and 5 respectively, to the first drying roll of a series of driers 6. The speed at which the paper web may travel through the machine is limited by the rate at which the water may be removed from the web and the felt aprons associated therewith, since if the paper web or the lower felt apron 3, for example, or both are oversaturated with water at the time when they pass between the sets of press rolls 4 and 5, it will not be possible to force enough water through the limited interstices of the lower felt apron to avoid the production of an undue amount of water directly in front of the press rolls at high speed, thus floating the paper fibres out of proper sheet formation and tending to curdle or gall the newly formed paper web.

According to the present invention, the removal of water is from the newly formed paper web as soon as possible after the formation of the web has taken place, preferably before the web reaches the lower couch roll, and is continued in regard to the paper web and the felt aprons associated therewith, preferably in successive stages before the aprons and paper web reach the press rolls, in such a manner that the web may be run through the press rolls at an increased speed without encountering sufficient back pressure of water to curdle or gall the web; in other words, the interstices of the lower felt apron 3, through which most of the water must be removed by the press rolls 4 and 5, are never oversaturated, whereby the occurrence of sufficient water in front of the press rolls which float the paper fibres out of sheet formation is avoided.

In the particular form of the invention illustrated the paper web is formed on a forming wire 1 which runs over a plurality of small rolls 7 and around a lower couch roll 8, the newly formed paper web being removed from the forming wire by means of an upper couch roll 9 carrying an upper felt apron 10 which is pressed by the upper couch roll into contact with the paper web carried by the forming wire 1. This upper couch roll 9 I prefer to position in advance of the couch roll 8, that is to say, in a position where it will engage the paper web before the latter reaches the lower couch roll 8, thus avoiding injury to the forming wire since the latter is not subjected to undue pressure between the couch rolls which would tend to crystallize the wire and thus shorten its life. As illustrated, an auxiliary lower couch roll 11 is employed and the upper couch roll 9 is disposed between the couch rolls 8 and 11 in such manner that only a gradual curvature of the forming wire is necessary where the wire passes between the rolls. It is also preferred to employ a suction roll for the upper couch roll 9 and the curvature of the forming wire 1 adjacent the roll should be such as to obtain a working suction surface on the roll 9 which will cause the newly formed paper web 2 to be transferred from the forming wire to the under surface of the upper felt apron 10. During this operation a certain amount of water will be removed both from the newly formed paper web and the upper felt apron 10.

After the paper web passes from the lower couch roll 8 toward the press rolls 4 and 5, there has oftentimes been found a tendency of the web to sag on account of which tendency the press rolls sometimes have been run at a slightly greater speed than the couch roll, but this disturbs the bond between the fibres of the paper web and weakens the latter. According to the present invention the upper felt apron 10 supports the paper web after the latter leaves lower couch roll 8 with the result that there is no tendency for stretching of the web or weakness developed therein by attempts to overcome such tendency.

After the paper web 2 leaves lower couch roll 8 it passes with upper felt apron 10 over and along with the upper surface of the lower felt apron 3. Since most of the water removed, either from the paper web or the felt aprons must pass through the lower felt apron 3, the latter is constantly showered and washed with water, for example, by the shower pipes 12 and the whipper 13. As the lower felt apron 3 comes into contact with the paper web, it passes over a suction roll 14 in such manner that the latter removes a considerable portion of the water from the lower felt apron, and also some water from the paper web. Preferably also one or more further rollers 14 are placed beneath the web 3 in advance of the press rolls 4 and 5 in order to remove water from the web and lower felt apron in successive stages. Thus, when the paper web and the felt aprons pass between the press rolls 4 and 5, a sufficient amount of water has been previously removed therefrom to permit the same to pass between the rolls at relatively high speed without floating the paper fibres. A suction roll also may be employed as the lower press roll 5 to assist further in removing water from the apron 3 and paper web 2. Thus, when the aprons and paper web pass through the final set of press rolls a sufficient amount of water has been removed therefrom to permit the final proper expulsion of water before the paper web passes to the drier 6. For example, where two sets of press rolls are used, the first set may take out approximately one-half of the water remaining in the paper web at that point in its travel before the web passes to the second set of press rolls.

The upper felt apron 10 is less in need of washing than the lower felt apron since less water passes through it; but the upper felt apron must be washed at intervals by means such as the shower pipe 15 and whipper 16. During this operation the upper felt apron becomes more saturated with water and the machines sometimes have been slowed down to avoid injury to the paper web by the excess water at press rolls 4 and 5. With a machine of the present structure, however, the suction upper couch roll 9 removes sufficient water from the upper felt apron 10 to permit the machine to be run at normal speed while the upper felt is being washed and without injury to the paper web.

After the paper web passes through the final set of press rolls 4 and 5. I prefer to pass the upper felt apron 10 around a roll 17 which presses on the first drier 6, with the result that the upper felt apron 10 picks up the newly formed paper web from forming wire 1 and supports it during its entire travel through the press rolls until it reaches the series of driers.

In my Patents Numbers 1,472,572, Oct. 30, 1923 and 1,479,265, Jan. 11, 1924, I have described and claimed subject matter related to that contained herein.

While a specific embodiment of the invention has been described, it will be obvious that many changes may be made therein without departing from the principle of the invention as defined in the following claims.

I claim:

1. A paper making machine comprising an upper couch roll carrying a felt apron, a lower couch roll carrying a forming wire, said upper couch roll being located in advance of and out of contact with said lower couch roll and being adapted to press the felt apron into contact with the paper web carried by the forming wire.

2. A paper making machine comprising a suction upper couch roll carrying a felt apron, a lower couch roll carrying a forming wire, said upper couch roll being located in advance of said lower couch roll and being adapted to press the felt apron into contact with the paper web carried by the forming wire.

3. A paper making machine comprising an upper couch roll carrying a felt apron, a lower couch roll carrying a forming wire, an auxiliary lower couch roll also associated with said forming wire, said upper couch roll being located between and out of contact with the lower couch rolls and being adapted to press the upper felt apron into contact with the paper web carried by the forming wire.

4. A paper making machine comprising a suction upper couch roll carrying a felt apron, a lower couch roll carrying a forming wire, an auxiliary lower couch roll also associated with said forming wire, said upper couch roll being located between said lower couch rolls and being adapted to depress the forming wire between the lower couch rolls sufficiently to form a working suction surface and produce a gradual curve in the forming wire.

5. A paper making machine comprising an upper couch roll, a felt apron, a lower couch roll carrying a forming wire, said upper couch roll being located in advance of said lower couch roll, and means for removing the water from the felt apron when the apron is in contact with the paper web newly formed on the forming wire, and in advance of said lower couch roll.

6. A paper making machine comprising an upper couch roll carrying an upper felt apron, a lower couch roll carrying a forming wire, said upper couch roll being located in advance of said lower couch roll, press rolls, a lower felt apron passing between said press rolls and positioned to receive the paper web in advance of the press rolls, means for removing water from the upper side of the upper felt apron while in contact with the paper web and in advance of the lower couch roll, and means for removing water from the under side of the lower felt apron while the latter carries the paper web, and in advance of the press rolls.

7. A paper making machine comprising means for forming a paper web, press rolls, a lower felt apron passing between said press rolls and positioned to receive the paper web in advance of the press rolls, and means for removing water in successive stages from the under side of the lower felt apron while carrying the paper web and in advance of the press rolls, said means comprising a plurality of suction rolls disposed beneath the lower felt apron and located in advance of the press rolls.

8. A paper making machine comprising means for forming a paper web, press rolls, a lower felt apron passing between said press rolls and positioned to receive the paper web in advance of the press rolls, and means for removing water in successive stages from the under side of the lower felt apron while carrying the paper web and in advance of the press rolls, said means comprising a plurality of suction rolls disposed beneath the lower felt apron and located in advance of the press rolls, the lower press roll also being suction rolls.

9. A paper making machine comprising means for forming a paper web, press rolls, a lower felt apron passing between said press rolls and positioned to receive the paper web in advance of the press rolls, an upper felt apron also passing between said press rolls, means for removing water from the upper side of the upper felt apron while in contact with the paper web and in advance of the press rolls and means for removing water from the under side of the lower felt apron while the latter carries the paper web and also in advance of the press rolls.

10. A paper making machine comprising means for forming a paper web, press rolls, a lower felt apron passing between said press rolls and positioned to receive the paper web in advance of the press rolls, a suction upper couch roll, an upper felt apron passing around said upper couch roll and between said press rolls, said upper couch roll being positioned to engage the paper web when the latter is on said web forming means and a plurality of suction rolls disposed beneath the lower felt apron and located in advance of the press rolls.

11. A paper making machine combining a lower couch roll carrying a forming wire, a suction upper couch roll carrying an upper felt apron whereby said upper felt apron removes the paper web from the forming wire through the action of said suction couch roll, said upper couch roll being located in advance of the lower couch roll, press rolls, a drying roll, said upper felt apron passing between said press rolls and into contact with said drying roll whereby the upper felt apron carries the paper web on its under surface from the forming wire between the press rolls and onto the drying roll.

12. A paper making machine comprising a suction upper couch roll carrying an upper felt apron and a lower couch roll carrying a forming wire, press rolls through which the upper felt apron passes, and means for removing water from the lower side of the paper web while in contact with the upper felt apron and before said paper web reaches the press rolls.

13. A paper making machine comprising an upper couch roll carrying a felt apron, a lower couch roll carrying a forming wire, said upper couch roll being located in advance of and out of contact with said lower couch roll and being adapted to press the felt apron into contact with the paper web carried by the forming wire, said paper making machine including means for removing water from the paper web while in contact with the felt apron aforesaid, and before the web is subjected to the squeeze of any press rolls.

14. A paper making machine comprising an upper couch roll carrying a felt apron, a lower couch roll carrying a forming wire, said upper couch roll being located in advance of and out of contact with said lower couch roll and being adapted to press the felt apron into contact with the paper web carried by the forming wire, said paper making machine including means for passing a current of air through the paper web while in contact with the felt apron aforesaid and before the web is subjected to the squeeze of any press rolls.

15. A paper making machine having a forming member, press rolls and drier rolls, a felt apron engaging said forming member and passing between said press rolls and into contact with the first roll of the drier section of the machine, a second felt apron meeting the paper web at a point in advance of the press rolls and also passing through said press rolls, and means for applying suction to said last mentioned felt apron in advance of the press rolls.

16. A paper making machine having a forming member, press rolls and drier rolls, a felt apron engaging said forming member and passing between said press rolls and into contact with the first roll of the drier section of the machine, a second felt apron meeting the paper web at a point in advance of the press rolls and also passing through said press rolls, and means for applying suction to both of said felt aprons and the paper web in advance of the press rolls.

17. A paper making machine having a forming member, press rolls and drier rolls, a felt apron engaging said forming member and passing between said press rolls and into contact with the first roll of the drier section of the machine, a second felt apron meeting the paper web at a point in advance of the press rolls and also passing through said press rolls and means for passing a current of air through both of said felt aprons and the paper web in advance of the press rolls.

JOHN D. TOMPKINS.

Witnesses:
H. C. NORTH,
MARY HAGUE.